June 9, 1942.    M. H. SIDEBOTHAM    2,285,537
INFOLD AND OUTFOLD BOX MACHINE
Filed Jan. 23, 1940    8 Sheets—Sheet 1

Inventor,
Melvin H. Sidebotham,
By Roderick Wm Hoag, Attorney.

June 9, 1942. M. H. SIDEBOTHAM 2,285,537
INFOLD AND OUTFOLD BOX MACHINE
Filed Jan. 23, 1940  8 Sheets-Sheet 2

Inventor:
Melvin H. Sidebotham,
By Roderick Wm Hoag, Attorney.

Inventor,
Melvin H. Sidebotham,
By Roderick Wm Hoag, Attorney.

June 9, 1942. M. H. SIDEBOTHAM 2,285,537
INFOLD AND OUTFOLD BOX MACHINE
Filed Jan. 23, 1940 8 Sheets-Sheet 5

Inventor:
Melvin H. Sidebotham,
By Roderick Wm Hoag, Attorney.

Inventor,
Melvin H. Sidebotham,
By Roderick Wm Hoag, Attorney.

June 9, 1942. M. H. SIDEBOTHAM 2,285,537
INFOLD AND OUTFOLD BOX MACHINE
Filed Jan. 23, 1940 8 Sheets-Sheet 8

Inventor:
Melvin H. Sidebotham,
By Roderick W<sup>m</sup> Hoag, Attorney.

Patented June 9, 1942

2,285,537

UNITED STATES PATENT OFFICE 2,285,537

INFOLD AND OUTFOLD BOX MACHINE

Melvin H. Sidebotham, West Newton, Mass.

Application January 23, 1940, Serial No. 315,187

19 Claims. (Cl. 93—49)

This invention relates to the manufacture by automatic machinery of boxes of the type commonly known as "knock-down" or wall boxes which are furnished to the trade in flat or collapsed in order to save space in stock rooms and in stores, and also for saving transportation costs. Such boxes are easily opened or set up as they are needed for use, and when so set up have upright walls. Boxes of this type are used for innumerable packaging and wrapping purposes in commerce and industry.

This present invention includes improvements over the machine disclosed and claimed in United States Patent No. 1,488,756 issued April 1, 1924, to Leon E. LaBombard and Melvin H. Sidebotham; the present applicant, Melvin H. Sidebotham, being a joint patentee of said patent. This present invention also includes improvements over the machine disclosed and claimed in my co-pending application filed with the United States Patent Office February 13, 1939 and to which was assigned Serial No. 256,030. The machine herein disclosed represents many improvements over machines heretofore produced, and it is adaptable to produce folding boxes of many different types of construction.

One object of my invention is to provide a new and simple mechanism for making folding boxes.

Another object of this invention is to provide a machine for fabricating either infold or outfold boxes by making simple adjustments to the machine.

Other more specific objects and advantages of the invention will be apparent to persons skilled in the art as the same becomes better understood by reference to the following description taken in connection with the accompanying drawings, in which I have illustrated one practical embodiment of my invention, one set of drawings showing the machine adjusted to make infold boxes and a set of drawings showing the machine adjusted to make outfold boxes, and wherein:

Figure 16 represents the infold type box in flat folded condition, after the final operation of folding the end margins.

Figure 17 is a plan view of the box in set-up condition.

Figure 18 is a side elevation of Figure 17.

Figure 19 is an end elevation of Figure 18.

Figures 21 to 38 inclusive illustrate the machine adjusted to perform the operations to produce boxes of the outfold type by making simple adjustments and changes in the mechanism shown in Figures 1 to 6 inclusive.

Figure 6:
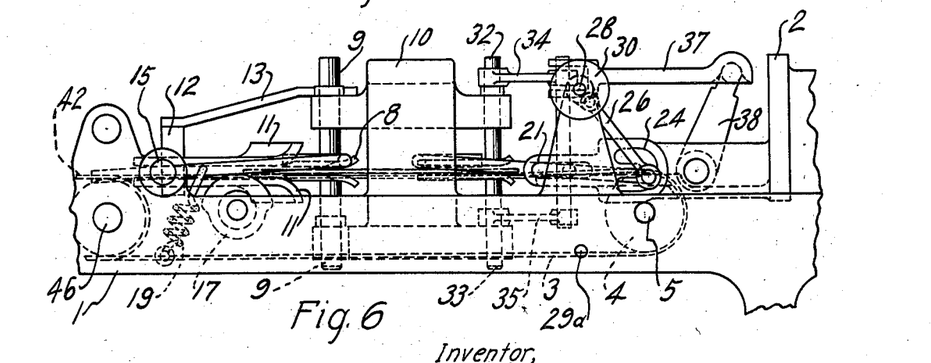
Figure 6 is a side elevation of the mechanism shown in Figure 5.
Figure 7:
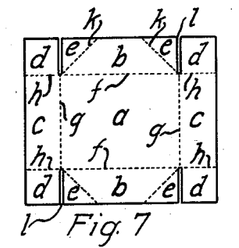
Figure 7 represents a plan view of a cut and scored blank upon which the machine may operate to produce an infolded box in collapsed condition.
Figure 8:
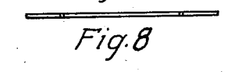
Figure 8 is an edge view of the blank shown in Figure 7.

It should be understood that my improved machine is adapted to make many different types of boxes which require infold and outfold operations. The operations for making two types of folding wall boxes are herein described, that is, "infold" type boxes, as illustrated by Figures 7 to 20 inclusive, and "outfold" type boxes, as illustrated by Figures 27 to 38 inclusive. The machinery shown in Figures 1 to 6 inclusive, is shown adjusted to operate on infold box blanks cut and scored as shown in Figure 7, to produce infold type boxes as illustrated by Figures 16 to 20 inclusive. The machinery shown in Figures 21 to 26 inclusive, is shown adjusted to operate on outfold type box blanks cut and scored as shown in Figure 27, to produce outfold type boxes as illustrated by Figures 34 to 38 inclusive.

Figures 9, 11:
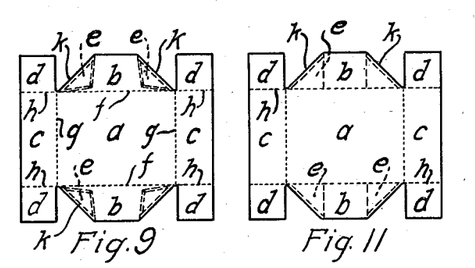
Figure 9 is a plan view of the blank showing the side wall end segments in partially folded condition.
Figure 11 is a plan view of the blank showing the side wall end segments doubled flat against the underside of the blank.
Figures 10, 12:
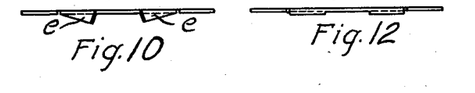
Figure 10 is an edge view of the blank shown in Figure 9.
Figure 12 is an edge view of the blank shown in Figure 11.
Figure 13:
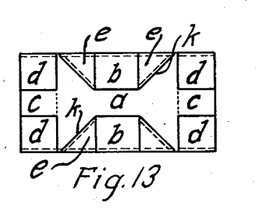
Figure 13 is a plan view of the blank showing opposite side margins folded inwardly upon center areas of the blank.
Figure 14:
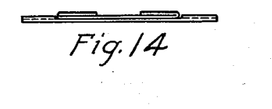
Figure 14 is an edge view of Figure 13.
Figure 15:
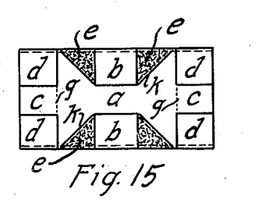
Figure 15 is the same as Figure 13 except that areas are shown to which adhesive may be applied in making the box in flat folded condition.
Figure 20:
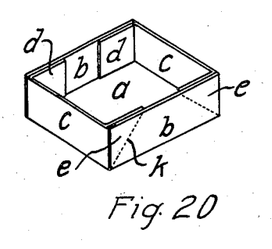
Figure 20 is a perspective view of the infold type box shown in Figures 17, 18 and 19 tilted so as to show a portion of the interior thereof.

It will aid toward an understanding of the operation of the machine for fabricating the boxes, to first explain the action of the machine which effects the production of the completed box in "knock-down" condition from a cut and scored blank. Figure 7 illustrates the cut and scored blank from which the infold type of box is made and wherein scored lines are indicated by dotted lines $f$, $g$, $h$ and $k$, and cuts are shown as slots marked $l$. The said cuts and dotted lines effect a division of the blank to form a bottom section $a$, side walls $b$, side wall end segments $e$, end walls $c$, and end wall flaps $d$. Figures 9 and 10 illustrate the condition of the blank after it has been acted upon by devices which serve to partially fold the side wall end segments $e$ downward and under the corresponding side walls $b$. Figures 11 and 12 show the side wall flaps pressed in position flat against the corresponding side walls. Folding devices then operate on opposite side margins to fold the side walls $b$ and the end wall flaps $d$ against mid-areas of the blank as shown in Figures 13 and 14. Adhesive is then applied to the side wall flaps $e$ as shown in Figure 15. The end walls $c$ are then folded toward each other and down against the top of the blank causing the end wall flaps $d$ to contact the corresponding side wall end segments $e$. Thus the adhesive on the side wall end segments $e$ serves to secure together the side wall end segments $e$ and the end wall flaps $d$. The box is then in completed flat folded condition, as shown in Figure 16 ready to be set up when required for use. The box is set up for use by simply raising the side walls $b$, with the result that the end walls $c$ will be drawn to upright position by the unfolding of the side wall end segments $e$ and the end wall flaps $d$. Figures 17 to 20 inclusive illustrate the infold type box in set-up condition.

Figure 29:
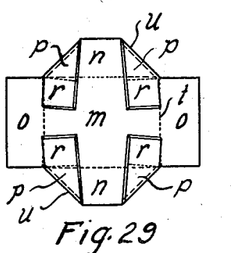
Figure 29 is a plan view of the outfold blank after the first folding operation has been started.
Figure 30:
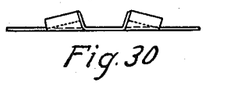
Figure 30 is an edge view of Figure 29.
Figure 31:
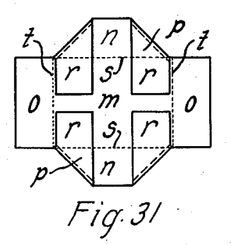
Figure 31 is a plan view of the outfold blank after the first folding operation has been completed.
Figure 32:
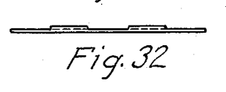
Figure 32 is an edge view of Figure 31.
Figure 33:
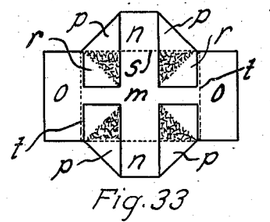
Figure 33 is the same as Figure 31 except that areas are shown to which adhesive may be applied in the method of producing an outfold type box.
Figure 34:
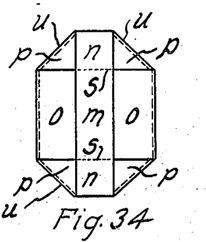
Figure 34 is a plan view of the outfold type box, in collapsed condition, after the final folding operation has been completed.
Figure 35:
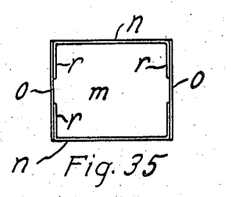
Figure 35 is a plan view of an outfold type box in set-up condition.
Figure 36:
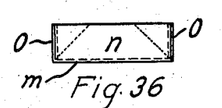
Figure 36 is a side elevation of the box shown in Figure 35.
Figure 37:
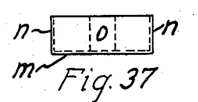
Figure 37 is an end view of the box shown in Figure 36.
Figure 38:
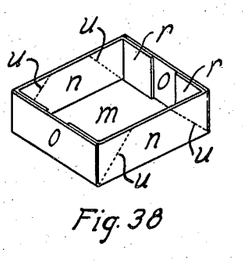
Figure 38 is a perspective of the box shown in Figures 35, 36 and 37 tilted so as to show a portion of the interior thereof.

Figures 27 to 34 illustrate the progressive steps for producing outfold type boxes by the use of my improved machine. Figure 27 illustrates the cut and scored blank from which the outfold type of box is made, and wherein scored lines are indicated by dotted line $s$, $t$, $u$ and $v$, and cuts are shown as slots marked $w$. The said cuts and dotted lines effect a division of the blank to form a bottom section $m$, side walls $n$, side wall end segments $p$, segment flaps $r$, and end walls $o$. Figures 29 and 30 illustrate the condition of the blank after it has been acted upon by devices which serve to partially fold the side wall end segments $p$ together with the segment flaps $r$ upwardly and over the top of the blank. Figures 31 and 32 show the side wall end segments $p$ and the segment flaps $r$ pressed against areas of the upper surface of the blank. Figure 33 shows areas on which adhesive is applied to segment flaps $r$. The final folding operation consists in folding the end walls $o$ upwardly on lines $t$ and then downward to contact segment flaps $r$. The segment flaps $r$ being adhesively treated, serve to secure said segment flaps to the corresponding end walls $o$. The box is then in the condition illustrated by Figure 34. This outfold box is set up by simply raising the end walls $o$ to upright position. It will be obvious that by raising the end walls, the side walls will also be raised by the unfolding of the side wall end segments. Figures 35 to 38 inclusive, illustrate the outfold type box in set-up condition.

Figure 1:
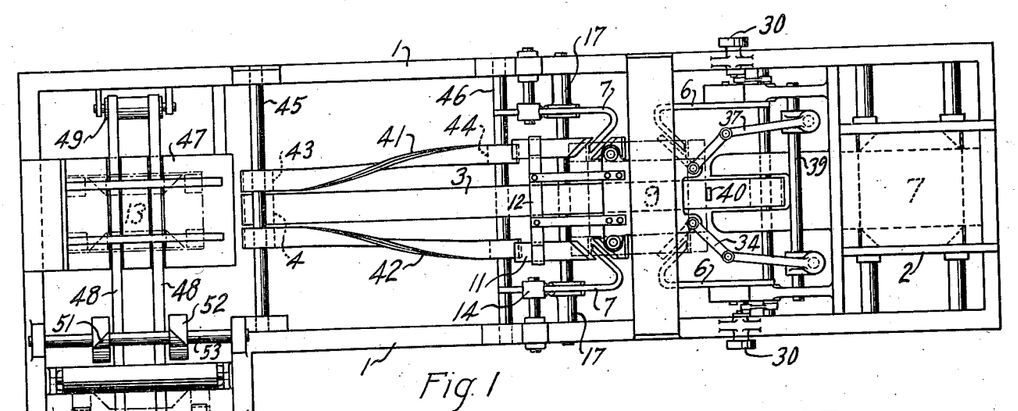
Figure 1 is a plan view of the feed end of the machine, adjusted to make infold type boxes.
Figure 2:
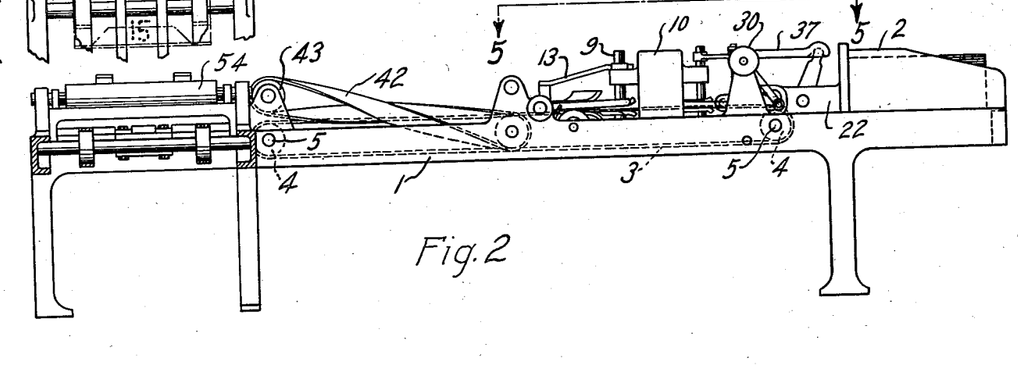
Figure 2 is a side elevation of the feed end of the machine shown in Figure 1.
Figure 3:
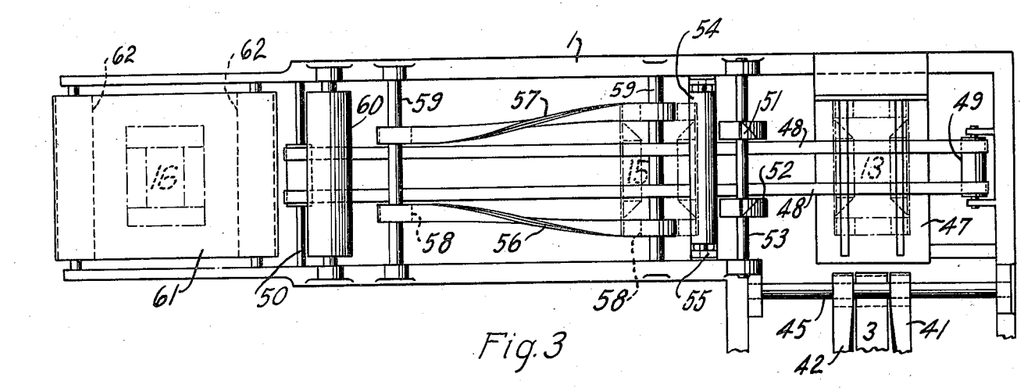
Figure 3 is a plan view of the delivery end of the machine, which is at right angles to the feed end of the machine shown in Figure 1.
Figure 4:
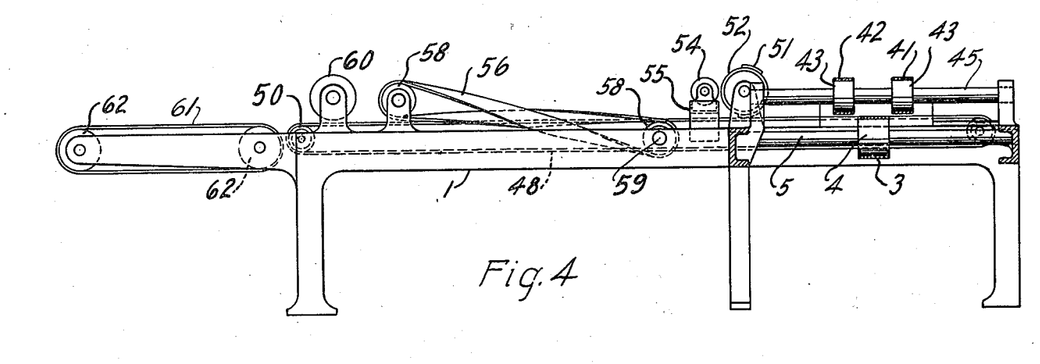
Figure 4 is a side elevation of the delivery end of the machine.

Referring to Figures 1 to 6 inclusive; these several figures taken together illustrate the complete machine adjusted to make infold type boxes. Figures 1 and 3 taken together indicate a plan view of the entire machine. The right hand portion of Figure 3 duplicates parts shown at the left hand end of Figure 1 to render it clear that the parts of the machine shown in the two figures operate at an angle to each other.

For purposes of description the feed end of the machine is the rear end, and the delivery end is the front end. Also the front end of the blank is the end nearest the delivery end of the machine, and the opposite end of the blank is the rear end. In said Figures 1 and 3 some of the positions of the blanks are indicated by dot and dash lines where the dotted numerals 7, 9, 13, 15 and 16 appear. Those dotted numerals are employed to show that at those points on the machine the blanks are in substantially the condition shown by Figures 7, 9, 13, 15 and 16. In other words, each blank when it reaches the position indicated by dotted numeral 9 (Fig. 1) is in the condition shown by Figure 9; when the blank reaches the position indicated by dotted numeral 13 it is substantially as shown by Figure 13; and so on until when it reaches the position indicated by dotted numeral 16 (Fig. 3) the blank has been formed to provide an infold type box in flat folded condition. In other words, each blank when it reaches position 9 (Fig. 1) it is as shown in Figure 9; when it reaches position 13 it is substantially as shown by Figure 13; and so on until when it reaches position 16 (Fig. 3) it is as shown by Figure 16. The timing is such that when the machine is in operation different parts of the machine are operating simultaneously on blanks which are spaced about as indicated by the dotted line indications of the blank in Figures 1 and 3. In other words, while one part of the machine is performing an operation on one blank other parts of the machine are at the same time performing other operations on other blanks, all of said blanks following one another progressively through the machine and are delivered therefrom as complete boxes in collapsed condition as shown in Figure 16.

It will be readily understood, without need of illustration, that any suitable motor may be employed for operating the machine, and that suitable gearing is employed in practice to cause the various rolls and shafts to rotate at uniform peripheral speed to effect travel of the blanks through the machine and to operate the various devices which act on the blanks in the sequence described.

In order to clearly illustrate the novel features of my improved machine, I have omitted from the drawings all mechanisms and devices not essential to an understanding of what I claim to be new and novel subject matter of my invention.

The support for the machine consists of a main frame 1 (Figs. 1, 2, 3 and 4), suitable bearings being provided in said main frame for attaching the different mechanisms thereto.

Figure 5:
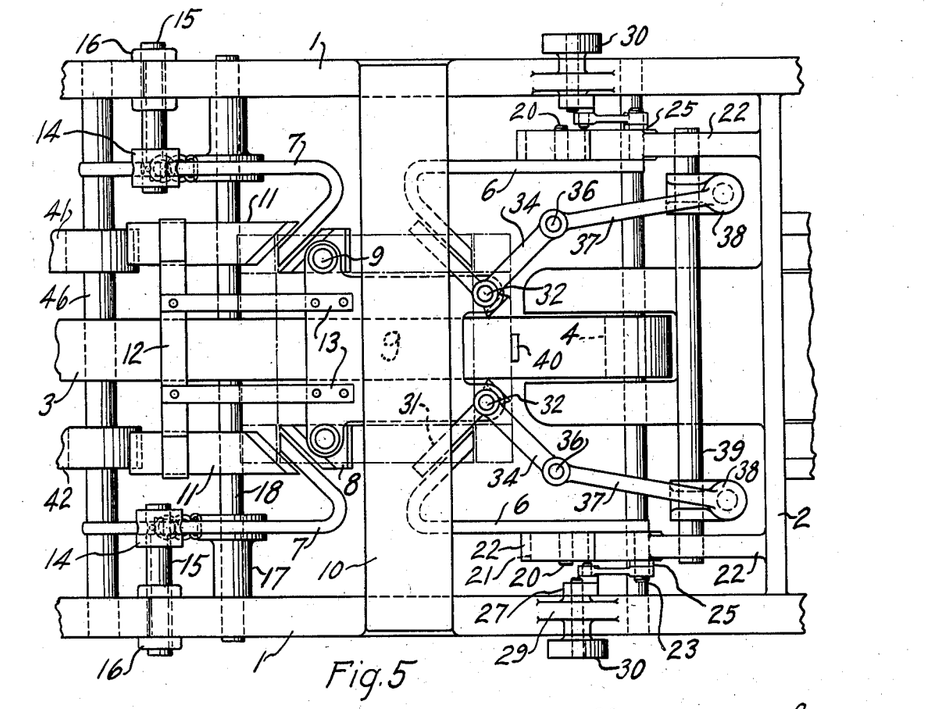
Figure 5 represents a plan view at 5—5 of Figure 2 on a larger scale.

Blanks which have been shaped, creased and cut, as indicated in Figure 7 and more fully described above, may be cut and scored by any of the well known methods in common use in the art. Blanks (Fig. 7) of the shape above described are delivered singly and successively from a feed hopper 2 to a conveyor belt 3 carried by rolls 4 secured to shafts 5 journaled in main frame 1 (Figs. 1 and 2). The said conveyor belt 3 conveys the blank to the segment folding position indicated by the dot and dash outline of the blank marked by the dotted numeral 9 in Figures 1 and 5. At this position the blank is operated on by devices which fold side wall end segments e (Fig. 7) to the condition illustrated by Figure 9. The segment folding mechanism includes two segment folding rods 6 and two segment bending rods 7 (Figs. 5 and 6). Segment bending guides 8 fixed to spindles 9 secured in yoke 10 are provided to assure bending the segments at the forward end of the blank on diagonal lines k. Folding bars 11 secured to bracket 12 supported by braces 13 serve to fold the deflected segments at the forward end of the blanks as the blanks are advanced. Said folding bars 11 also serve to retain the folded segments at the rear of the blanks in folded condition as said blanks are being conveyed forward. The segment bending rods 7 are adjustably secured to hubs 14 fixed to shafts 15 journaled in frame 1 and are held in position on said frame by collars 16. The said flap bending rods 7 operate up and down at predetermined intervals by the rotation of cams 17 secured to shaft 18 journaled in frame 1. Tension springs 19 each having one of its ends secured to the frame 1 and its other end fixed to the corresponding segment bending rod 7 serves to hold the said segment bending rods in contact with the cams 17. The side wall end segments e at the rear end of the blank are folded downwardly and up against the bottom surface of the blank by the operation of segment folding rods 6 each having secured thereto a pivot pin 20 slidably mounted in slot 21 provided in rod bracket 22. Said segment folding rods 6 are each provided with a driving pin 23 operatively mounted in corresponding guide slot 24. The connecting links 26 each have its lower end rotatably mounted on the end of the corresponding driving pin. Spacers 25 serve to hold the connecting links in proper lateral relation with brackets 22. The upper end of each of said connecting links 26 is rotatably connected with corresponding crank lever 27 secured to shaft 28 journaled in bearing 29 on frame 1. Shafts 28 are driven by pulleys 30 secured thereto. Each segment folding rod 6 is operated by power supplied to rotate corresponding pulley 30 which serves to turn shaft 28. The crank lever 27 being secured to the shaft 28 will pivot about the shaft, thus causing the upper end of connecting link 26 to oscillate about the said shaft 28. The lower end of each connecting link 26 is connected to the end of the segment folding rod 6 by means of driving pin 23 which controls the movement of the said segment folding rod 6. With the upward and horizontal movement of driving pin 23 within the control slot 24, the segment folding rod 6 will pivot about pivot pin 20 and move forward as permitted by slot 21 in rod bracket 22. Thus it will be apparent that with the rotation of pulley 30 the segment folding rod 6 will be caused to operate. The front or hooked end of the segment folding rod 6 will move first downwardly pivoting about pin 20 as the opposite end of said rod moves vertically in guide slot 24. This downward movement of the hook end of each segment folding rod 6 operates to bend downwardly the side wall end segments e (Fig. 7). The horizontal movement of each segment folding rod serves to fold said segments upwardly against the bottom surface of the blank.

To assure accurate folding of the side wall end segments e at the rear end of the blank, a pair of folding guides 31 is provided at each rear corner. Each pair of folding guides 31 is secured to vertical shafts 32 and 33 pivotally mounted in yoke 10. Levers 34 and 35 are secured to vertical shafts 32 and 33 respectively. Each pair of said levers 34 and 35 is connected together by a pin 36. Connecting bars 37 connect levers 38 with pins 36 to operate the said folding guides 31 by means of levers 34 and 35 and shafts 32 and 33. Rocker shaft 39 to which connecting levers 38 are secured, operates at predetermined intervals to register the folding guides 31 with the creased lines k (Fig. 7) at the rear corners of the blank. The rocker shaft then operates to swing the said folding guides 31 forward and away from contact with the folded segments at the rear of the blank. The blank is advanced from the segment folding station by the conveyor belt 3 which is provided with lugs 40 which at timed intervals arrive at the rear edge of the blanks to carry them forward. In the progress of each blank forward it is acted upon by twisted belts 41 and 42 driven by pulleys 43 and 44 secured to shafts 45 and 46 respectively journaled in frame 1. The twisted belts operate in the conventional manner to fold the side walls b and the side wall end segments e and the end wall flaps d from the condition illustrated by Figure 11 to the folded condition illustrated by Figure 13.

The folded blank is then carried by the conveyor belt 3 to the transfer table 47 supported by frame 1. From said transfer table 47 the blank is carried forward by carrier belts 48 driven by rolls 49 and 50 journaled in frame 1. The blank then passes to the adhesive applying device. Adhesive is applied to predetermined areas of side wall end segments e, shown in Figure 15, by pads 51 fastened to wheels 52 fixed to shaft 53 journaled in frame 1. Adhesive is applied to said pads 51 by contact with adhesively coated roll 54 journaled in reservoir 55. Said roll 54 is coated with adhesive by causing it to rotate in liquid adhesive contained in reservoir 55 supported by frame 1. The blank is then advanced to folding belts 56 and 57, which fold the blank on lines g (Fig. 15). The twisted folding belts 56 and 57 are driven by pulleys 58 secured to shafts 59 journaled in frame 1. After this last folding operation the folded blank passes under pressing roll 60 journaled in frame 1. The completed infold box in flat folded condition is then carried to delivery belt 61 driven by rolls 62 journaled in frame 1.

Figure 21:
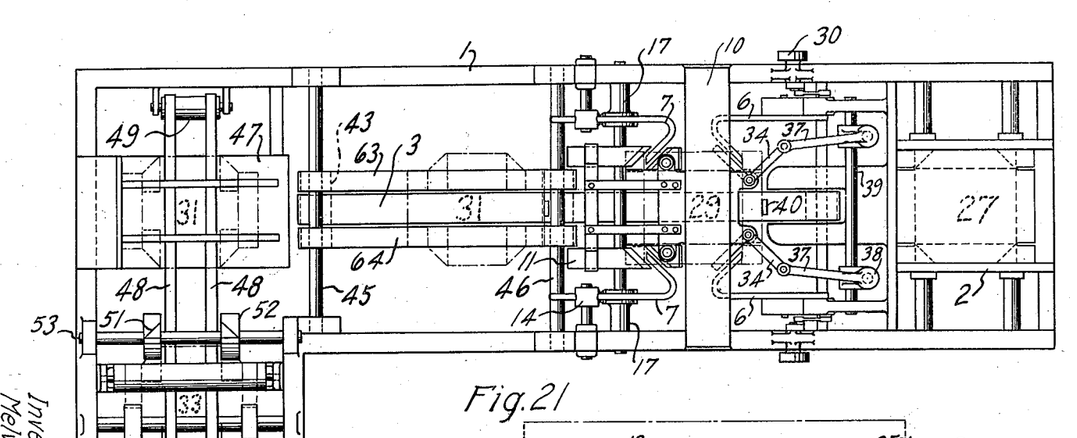
Figure 21 is a plan view of the feed end of the machine showing the mechanism which operates on blanks, cut and creased as shown in Figure 27, to produce outfold type boxes as shown in Figures 27 to 38 inclusive.
Figure 22:
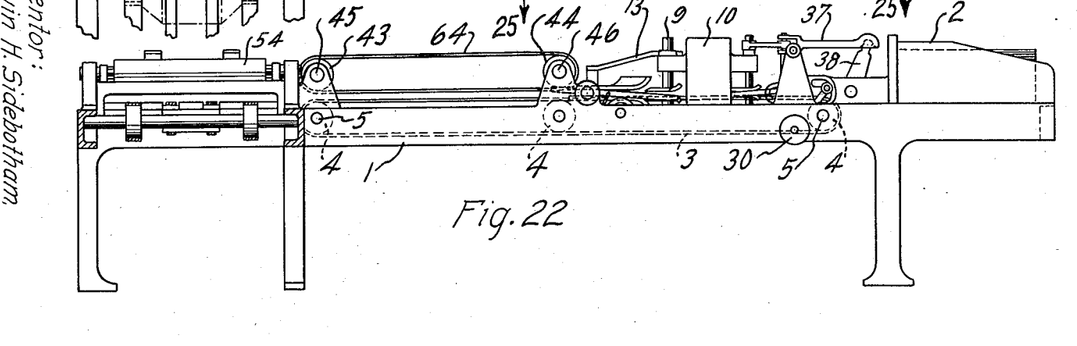
Figure 22 is a side elevation of the feed end of the machine shown in Figure 21, adjusted to make outfold type boxes.
Figure 23:
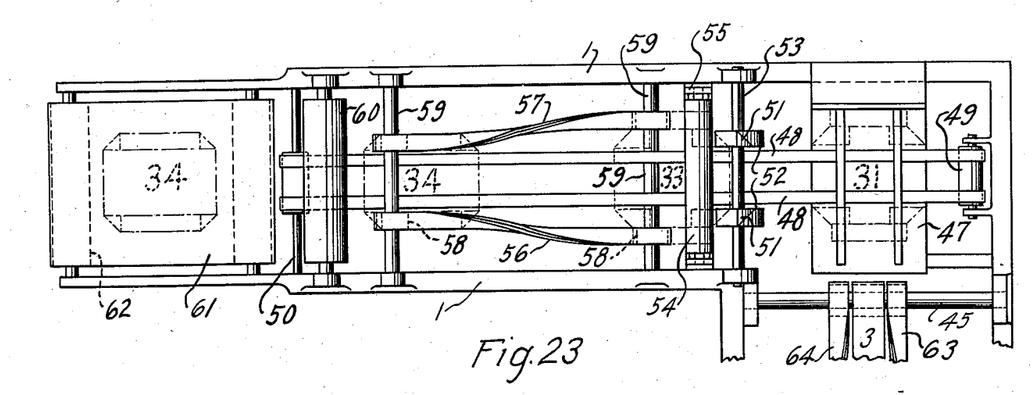
Figure 23 is a plan view of the delivery end of the machine, which is at right angles to the feed end of the machine, shown in Figure 21.
Figure 24:
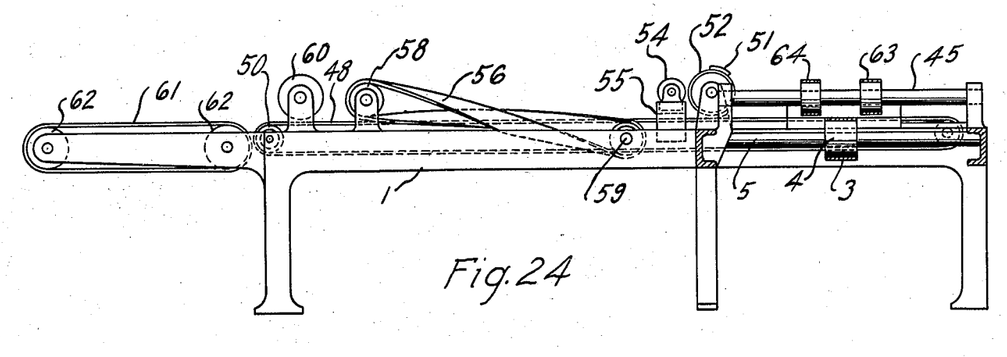
Figure 24 is an elevation of the delivery end of the machine shown in Figure 23.
Figure 25:
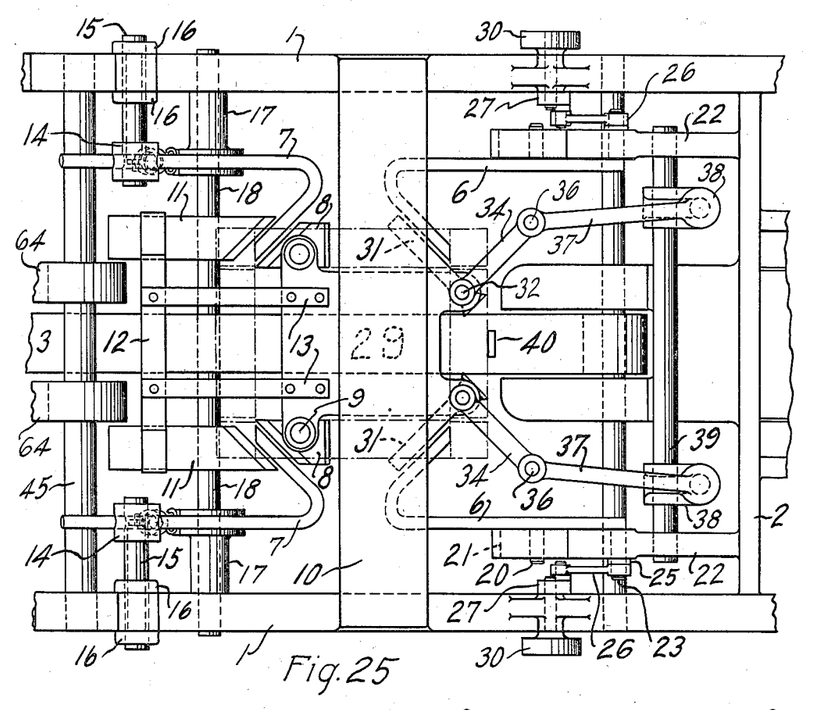
Figure 25 represents a plan view at 25—25 of Figure 22, on a larger scale.
Figure 26:
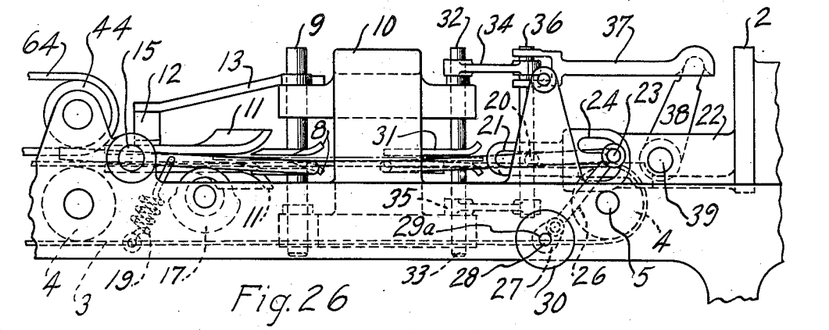
Figure 26 is a side elevation of the mechanism shown in Figure 25.
Figure 27:
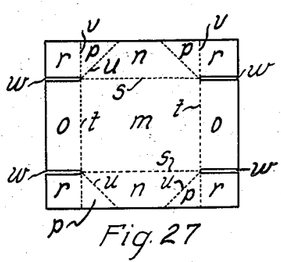
Figure 27 is a plan view of the cut and scored blank upon which the mechanisms shown in Figures 21 to 26 inclusive operate to produce the outfold box in flat folded condition, as shown in Figure 34.
Figure 28:
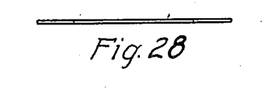
Figure 28 is an edge view of Figure 27.

Referring to Figures 21 to 26 inclusive, there is illustrated the machine adjusted to make outfold type boxes as shown in Figures 27 to 38 inclusive. The dotted numerals 27, 29, 31, 33 and 34 appearing in Figures 21, 23 and 25 are employed to show that at those points on the machine the blanks are in substantially the condition illustrated by Figures 27, 29, 31, 33 and 34. In order to render clear the differences in the adjustments and operations of the machine in making the two types of boxes illustrated, that is, infold and outfold boxes, I have duplicated in Figures 21 to 26 the parts and elements which perform the same function as shown in Figures 1 to 6 inclusive. In other words, Figures 21 to 26 inclusive illustrate the machine adjusted to make the outfold box while Figures 1 to 6 inclusive illustrate the machine adjusted to make infold boxes. Similar reference characters indicate similar parts or features in all of the views.

The frame of the machine is the same for making both infold and outfold boxes and consists of the main frame 1 (Figs. 21, 22, 23 and 24), suitable bearings being provided in said main frame for attaching the different mechanisms thereto.

Blanks which have been shaped, creased and cut, as indicated in Figure 27 and more fully described above, may be cut and scored by any of the well known methods in common use in the art. Outfold blanks (Fig. 27) of the shape above described are delivered singly and successively from a feed hopper 2 to a conveyor belt 3 carried by rolls 4 secured to shafts 5 journaled in main frame 1 (Figs. 21 and 22). The said conveyor belt 3 conveys the outfold type blank to the segment folding position indicated by the dot and dash outline of the blank marked by the dotted numeral 29 in Figures 21 and 25. At this position the blank is operated on by devices which fold side wall end segments p and the end segment flaps r (Fig. 27) to the condition illustrated by Figure 29. The segment folding mechanism includes two segment folding rods 6 and two segment bending rods 7 (Figs. 25 and 26). Segment bending guides 8 secured to spindles 9 secured in yoke 10 are provided to assure bending the segments at the forward end of the blank on creased lines u. Folding bars 11 secured to bracket 12 supported by braces 13 fixed to yoke 10 serve to fold the deflected segments and segment flaps at the forward end of the blanks, and serve also to retain in folded condition, the folded segments and end wall flaps at the rear of the blanks, as said blanks are being conveyed forward. The segment bending rods 7 are adjustably secured to hubs 14 fixed to shafts 15 journaled in frame 1 and held in position on said frame by collars 16. The said segment bending rods 7 operate up and down at predetermined intervals by the rotation of cams 17 secured to shaft 18 journaled in frame 1. Tension springs 19 each having one of its ends secured to the frame 1 and its other end fixed to the corresponding segment bending rod 7 serve to hold the said segment bending rods in contact with the cams 17. The side wall end segments p and the end segment flaps r at the rear end of the blank are folded upwards and down against the top surface of the blank by the operation of segment folding rods 6 having secured thereto pivot pins 20 slidably mounted in slots 21 provided in rod brackets 22. Said segment folding rods 6 are also provided with driving pins 23 operatively mounted in guide slots 24. The connecting links 26 each have its upper end rotatably mounted on the end of the corresponding driving pin 23. Spacers 25 serve to hold the connecting links in proper lateral relation with brackets 22. The opposite ends of said connecting links 26 are rotatably connected with crank levers 27 secured to shafts 28 journaled in bearing 29a on frame 1. Shafts 28 are driven by pulleys 30 secured thereto. Each segment folding rod 6 is operated by power supplied to rotate corresponding pulley 30 which serves to turn shaft 28. The crank lever 27 being secured to the shaft 28 will pivot about said shaft, thus causing the lower end of connecting link 26 to oscillate about the shaft 28. The opposite end of each connecting link 26 is operatively connected to the end of the corresponding segment folding rod 6 by means of driving pin 23 which controls the movement of the said segment folding rod 6. With the downward and horizontal movement of driving pin 23 within the control slot 24, the segment folding rod 6 will pivot about pivot pin 20 and move forward as permitted by slot 21 in rod bracket 22. Thus it will be apparent that with the rotation of pulley 30 the segment folding rod 6 will be caused to operate. The hooked end of the segment folding rod 6 will move first upwardly pivoting about pin 20 as the opposite end of said rod moves downward in guide slot 24. This upward movement of the hook end of each segment folding rod 6 operates to bend upwardly the side wall end segments p and the end segment flaps r (Fig. 27). The horizontal movement of each segment folding rod serves to fold the corresponding end segment and end segment flap downwardly against the top surface of the blank.

To assure accurate folding of the side wall end segments p and end segment flaps r at the rear end of the blank, folding guides 31 are provided secured to vertical shafts 32 and 33 pivotally mounted in yoke 10. Levers 34 and 35 secured to vertical shafts 32 and 33 respectively are connected together by pins 36. Connecting bars 37 connect levers 38 with levers 34 and 35 by means of pins 36 to operate the said folding guides 31. Rocker shaft 39, to which connecting levers 38 are secured, operates at predetermined intervals to register the folding guides 31 with the creased lines u (Fig. 27) on the blank, and then operates to swing the said folding guides forward and away from contact with the folded segments at the rear of the blank.

The blank is advanced from the segment folding station by the conveyor belt 3 which is provided with lugs 40 which at timed intervals arrive at the rear edge of the blanks to carry them forward. In the progress of each blank forward it passes under belts 63 and 64 driven by pulleys 43 and 44 secured to shafts 45 and 46 respectively journaled in frame 1. Said belts 63 and 64 operate in the conventional manner to hold the side wall end segments p and the end segment flaps r in folded condition as illustrated by Figure 31.

The folded blank is then carried by the conveyor belt 3 to the transfer table 47 supported by frame 1. From said transfer table 47 the blank is carried forward by carrier belts 48 driven by rolls 49 and 50 journaled in frame 1. The blank then passes to the adhesive applying device. Adhesive is applied to predetermined areas of the end segment flaps r, shown in Figure 33, by pads 51 fastened to wheels 52 fixed to shaft 53 journaled in frame 1. Adhesive is applied to said pads 51 by contact with adhesively coated roll 54 journaled in reservoir 55. Said roll 54 is coated with adhesive by causing it to rotate in liquid adhesive contained in reservoir 55 supported by frame 1. The blank is then advanced to twisted folding belts 56 and 57 which fold the blank on creased lines t (Fig. 33). The twisted folding belts 56 and 57 are driven by pulleys 58 secured to shafts 59 journaled in frame 1. After this last folding operation the blank is advanced under pressing roll 60 journaled in frame 1; thence the completed box in flat folded condition passes to delivery belt 61 driven by rolls 62 journaled in frame 1.

The operation of the various parts of the machine having been described, further explanation of the operation of the entire machine will be unnecessary.

While the invention includes the combined instrumentalities above mentioned, I wish it to be understood that I consider the aforesaid means not only combinatively novel, but insofar as I am aware, certain of the devices going to make up such means are new in less combinations than the whole and some capable of individual use.

The blanks and boxes illustrated in Figures 7 to 20 inclusive and 27 to 38 inclusive are shown merely for the purpose of explaining the operation of the machine herein described and claimed. There are many other well known types of boxes which my improved machine is adapted to produce efficiently and at high speed.

Having now described my invention, what I claim is:

1. The combination in a box making machine, a folding rod having a hook at one of its ends and a driving pin at the other end, with a pivot pin secured intermediate the rod ends, and a rod bracket having a horizontal slot for the pivot pin and a vertical and horizontal slot therein to engage the driving pin.

2. The combination in a box making machine, a folding rod having a driving pin secured to an end thereof, with a pivot pin secured intermediate the ends of the said folding rod, and a rod bracket having a horizontal slot to engage the pivot pin and a slot to engage the driving pin.

3. The combination in a box making machine, a folding rod having a driving pin at an end thereof, with a pivot pin intermediate the ends of the said folding rod, and a rod bracket having a slot to engage the pivot pin and a slot to engage the driving pin.

4. In a machine for making folding boxes from prepared blanks, a box blank carrying device, means for folding predetermined areas at the rear margin of a box blank, pivoted horizontally operating folding guides synchronized to operate with rods for bending predetermined areas at the front margin of the blank, and stationary folder plates for folding the bent areas at the front margin of the blank flat against the blank while the blank is moving forward.

5. In a machine for making folding boxes from prepared blanks, a blank carrying device, means for folding predetermined areas at the rear end of a blank synchronized to operate with pivoted horizontally operating folding guides, means for bending predetermined areas at the front end of the blank over fixed bending guides, and stationary folding plates for folding the bent areas at the front end of the blank while the blank is moving forward.

6. In a machine for making folding boxes, a blank carrying device, pivoted horizontally operating folding guides, means for folding predetermined areas at the rear end of the blank over the pivoted horizontally operating folding guides, devices for bending predetermined areas at the front end of the blank just prior to their being operated upon by stationary folder plates for folding the bent areas at the front of the blank.

7. In a machine for making folding boxes, pivoted horizontally operating folding guides, means synchronized to operate with the pivoted horizontally operating folder guides for folding predetermined areas at the rear end of the blank on diagonal lines, devices for bending predetermined areas at the front end of the blank cooperating with folder plates for folding the bent areas to lie flat against the blank.

8. In a machine for making folding boxes, pivoted horizontally operating folding guides, means for folding predetermined areas at the rear end of the blank on lines governed by the pivoted horizontally operating folding guides, devices for bending predetermined areas at the front end of the blank over fixed bending guides, and folder plates for folding the bent areas to lie flat against the blank.

9. In a machine for making folding boxes, pivoted horizontally operating folding guides, means for folding predetermined areas at the rear end of the blank over the pivoted horizontally operating folding guides, devices for bending predetermined areas at the front end of the blank over fixed bending guides, means for folding the bent areas to lie flat against other areas of the blank, and folding devices for folding marginal portions of the blank.

10. In a machine for making folding boxes, pivoted horizontally operating folding guides, means for folding rear portions of box blanks over the pivoted horizontally operating folder guides, devices for bending front portions of box blanks over stationary bending guides, means for folding the bent areas to lie flat against other areas of the blank, folding devices for doubling side marginal portions of the blank and devices for doubling end marginal portions of the blank.

11. In a machine for making folding boxes from prepared blanks, comprising a blank carrying device, pivoted horizontally operating folding guides synchronized to operate with means for folding predetermined areas at the rear end of a box blank against the underside thereof, rods for bending downwardly predetermined areas at the front end of the blank, and stationary folder plates for folding the bent areas at the front end of the blank to lie flat against the underside of the blank while the blank is moving forward.

12. In a machine for making folding boxes from prepared blanks, comprising a blank carrying device, pivoted horizontally operating folding guides synchronized to operate with means for folding predetermined areas at the rear end of the blank against the underside thereof, means for bending downwardly predetermined areas at the front end of the blank over fixed bending guides, and stationary folder plates for folding the bent areas at the front end of the blank against the underside thereof while the blank is moving forward.

13. In a machine for making folding boxes, a blank carrying device, pivoted horizontally operating folding guides, means for folding predetermined areas at the rear end of the blank against the underside thereof on fold lines governed by the pivoted horizontally operating folding guides, devices for bending predetermined areas at the front end of the blank downwardly, and stationary folder plates for folding the bent areas at the front of the blank against the underside thereof.

14. In a machine for making folding boxes, pivoted horizontally operating folding guides, means for folding predetermined areas at the rear end of the blank against the underside thereof on fold lines controlled by the pivoted horizontally operating folding guides, devices for bending downwardly predetermined areas at the front end of the blank, folder plates for folding the bent areas to lie flat against the underside of the blank.

15. In a machine for making folding boxes, horizontally actuated folder guides, means cooperating with the horizontally actuated folder guides for folding under predetermined areas at the rear end of the blank, devices for bending down predetermined areas at the front end of the blank over fixed bending guides, folder plates for folding under the bent areas to lie flat against the blank.

16. In a machine for making folding boxes, pivoted horizontally operating folding guides, rods synchronized to operate with the pivoted horizontally operating folding guides for folding predetermined areas at the rear end of the blank against the upper surface thereof, devices for bending upwardly predetermined areas at the front end of the blank over fixed bending guides, means for folding the bent areas to lie flat against the upper surface of the blank, and folding devices for folding front and rear margins of the blank.

17. In a machine for making folding boxes, pivoted horizontally operating folding guides, rods for folding rear portions of box blanks on fold lines controlled by the pivoted horizontally operating folding guides, devices for bending front portions of box blanks upwardly over stationary bending guides, means for folding the bent areas to lie flat against top areas of the blank, and devices for doubling front and rear marginal portions of the blank.

18. In a machine for making folding boxes, pivoted horizontally operating folding guides, means for folding predetermined areas at the rear end of the blank over the pivoted horizontally operating folding guides, devices for bending predetermined areas at the front end of the blank over fixed bending guides, means for folding the bent areas to lie flat against other areas of the blank, folding devices for folding side marginal portions of the blank, adhesive applying means for adhesively treating areas of the blank, and folding means for folding end margins of the blank to contact the adhesively treated areas.

19. In an infold and outfold box making machine, comprising folding rods for folding predetermined areas of box blanks, rod controlling elements, bearings to operatively support the rod controlling elements while making infold boxes, and a second set of bearings in which the rod controlling elements may be positioned to make outfold boxes.

MELVIN H. SIDEBOTHAM.